United States Patent [19]

Chowdhury et al.

[11] Patent Number: 4,951,522
[45] Date of Patent: Aug. 28, 1990

[54] STEERING COLUMN SUPPORT

[75] Inventors: Dipak R. Chowdhury, Northville; James A. Mark, Dearborn Heights, both of Mich.

[73] Assignee: Ford Motor Company, Dearborn, Mich.

[21] Appl. No.: 411,154

[22] Filed: Sep. 22, 1989

[51] Int. Cl.$^5$ .............................................. B62D 1/19
[52] U.S. Cl. ..................................... 74/492; 188/371; 280/777
[58] Field of Search .................. 74/492, 493; 280/777; 188/371

[56] References Cited

U.S. PATENT DOCUMENTS

| | | | |
|---|---|---|---|
| 3,597,994 | 8/1971 | Shiomi | 74/492 |
| 3,600,971 | 8/1971 | Scarvelis | 74/492 |
| 3,612,223 | 10/1971 | Shiomi | 74/492 |
| 4,194,411 | 3/1980 | Manabe et al. | 74/492 |
| 4,330,139 | 5/1982 | Katayama | 74/493 X |
| 4,452,096 | 6/1984 | Workman | 74/492 |
| 4,627,306 | 12/1986 | Berenjian | 74/492 |
| 4,703,669 | 11/1987 | Hyodo | 74/492 |
| 4,773,674 | 9/1988 | Wierschem | 280/777 |
| 4,786,076 | 11/1988 | Wierschem | 280/777 |
| 4,838,576 | 6/1989 | Hamasaki et al. | 74/492 X |
| 4,901,592 | 2/1990 | Ito et al. | 280/777 X |

*Primary Examiner*—Allan D. Herrmann
*Attorney, Agent, or Firm*—James A. Kushman; Daniel M. Stock; Keith L. Zerschling

[57] ABSTRACT

A support (26) for mounting an energy absorbing steering column is disclosed as including a metal strap (30) that extends transversely with respect to the steering axis A and has a central portion (32) that mounts the steering column as well as having opposite ends (38) each of which includes a mounting portion (40) for mounting on the vehicle. The strap includes a pair of U-shaped portions (42) located between the central portion (32) and the opposite ends (38) thereof with the open end of each U-shaped portion (42) opening in the same direction as each other along the steering axis. Movement of the steering column along the steering axis deforms the strap to straighten the U-shaped portions (42) and absorb energy. Clamping connections (44) mount the mounting portions (40) of the strap (30) on opposite sides of the U-shaped portions such that pivoting of the mounting portions cooperates with straightening of the U-shaped portions to increase the steering column movement that absorbs energy. Different embodiments of the strap have the U-shaped portions opening either opposite to or in the same direction as the energy absorbing movement of the steering column. Openings (50) of another embodiment and grooves (52) of a further embodiment control the energy absorption characteristics during the steering column movement.

10 Claims, 3 Drawing Sheets

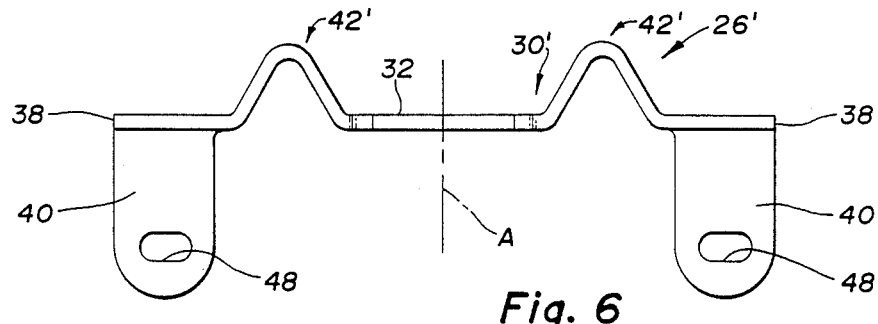
Fig. 6
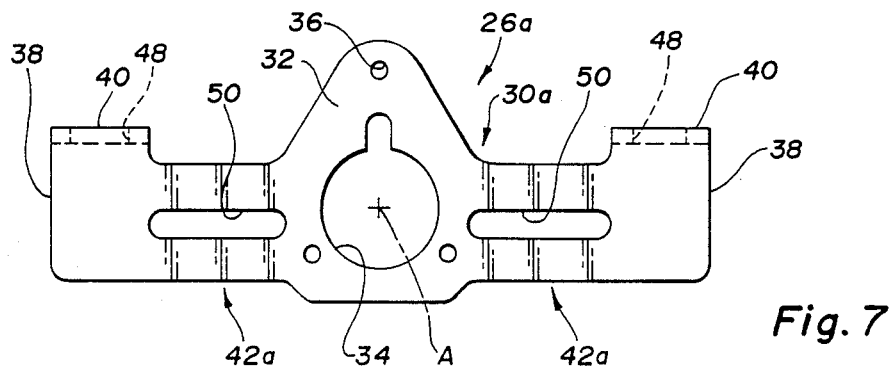
Fig. 7
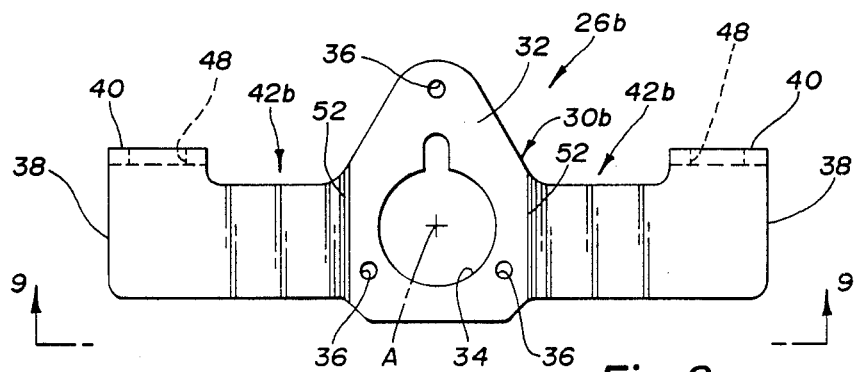
Fig. 8
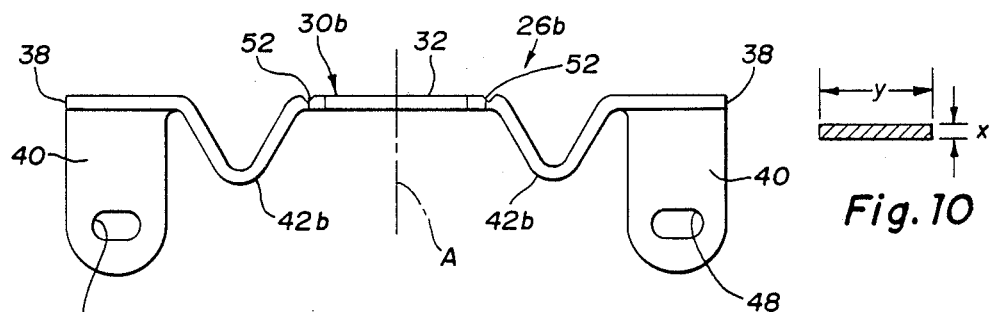
Fig. 9
Fig. 10

STEERING COLUMN SUPPORT

TECHNICAL FIELD

This invention relates to a steering column support for use with a vehicle energy absorbing steering column having a steering axis about which steering takes place during operation of the vehicle.

BACKGROUND ART

Energy absorbing steering columns for vehicles conventionally include a deformable support whose deformation during steering column movement provides the energy absorption. One such steering column support is disclosed by U.S. Pat. No. 4,627,306 Berenjian which includes a pair of energy absorption sections respectively located on opposite sides of a central portion that mounts the steering column by mounting pads respectively associated with each energy absorption section. These mounting pads are disclosed as being secured by bolt fasteners, and the energy absorption sections are disclosed as each having an L shape that deforms during the steering column movement. The length of the steering column movement is limited by the deformation to which the L-shaped energy absorption portions can deform.

Another energy absorbing steering column disclosed by U.S. Pat. No. 3,600,971 Scarvelis discloses an energy absorbing mounting arrangement having bracket members with legs that extend along the steering axis and are connected by an arcuate section to provide a hairpin like arrangement. A pair of such bracket members are utilized and each has one of its legs separately secured to the steering column and has its other leg provided with an apertured ear secured by a hanger bolt to the vehicle.

U.S. Pat. No. 3,597,994 Shiomi, et al, U.S. Pat. No. 3,612,223 Shiomi, et al, and U.S. Pat. No. 4,194,411 Manabe, et al disclose energy absorbing steering columns each of which includes a plate that extends along the length of the steering axis and has slits or openings at which the plate is deformed to provide energy absorption during steering column movement.

Other energy absorbing steering column supports include: shear pins that prevent initial movement and balls that are hardened and placed between adjacent walls with an interference fit to provide deformation as disclosed by U.S. Pat. No. 4,452,096 Workman; a metallic plate having slot-like deformation sections that are deformed by displacement bolts as disclosed by U.S. Pat. No. 4,786,076 Wierschem; an energy-absorbing carrier bracket that supports the steering column and has deformation sections that are recessed to provide a weakened area that deforms as disclosed by U.S. Pat. No. 4,773,674 Wierschem; and a steering column support bracket having first and second vent portions respectively located at upper and lower positions of the steering column as disclosed by U.S. Pat. No. 4,703,669 Hyodo.

DISCLOSURE OF INVENTION

An object of the present invention is to provide an improved energy absorbing steering column support that permits an increased stroke length during steering column movement by a construction that is effective during use as well as being economical to manufacture.

In carrying out the above object and other objects of the invention, the steering column support is designed for use with a vehicle energy absorbing steering column having a steering axis about which steering takes place during operation of the associated vehicle. The support mounts the steering column on the vehicle and is deformable to absorb energy as the steering column moves under loading. The support includes a metal strap that extends transversely with respect to the steering axis and has a central portion that mounts the steering column on the strap. This strap also has opposite ends each of which includes a mounting portion for mounting on the vehicle. A pair of U-shaped portions of the strap are respectively located between the central portion and the opposite ends thereof with the open end of each U-shaped portion opening in the same direction as the other along the steering axis whereby movement of the steering column along the steering axis deforms the strap to absorb energy as the U-shaped portions are opened to a generally straight shape extending between the opposite ends of the strap and the central portion thereof that mounts the steering column.

Provision of the U-shaped portions of the strap between the opposite ends thereof and the central portion permits an increased stroke length of movement of the steering column. This construction is effective and economical due to its fabrication as a strap extending between the opposite ends and the central portion.

In the preferred construction, the opposite ends of the metal strap have clamping connections that mount the mounting portions thereof on opposite sides of the U-shaped portions and permit pivoting of the mounting portions against the clamping force to cooperate with the straightening of U-shaped portions in increasing the steering column movement that absorbs energy. In one embodiment, the U-shaped portions open in the opposite direction along the steering axis to the direction of steering column movement during the energy absorption as the U-shaped portions are straightened. In another embodiment, the U-shaped portions open in the same direction along the steering axis as the direction of steering column movement during the energy absorption as the U-shaped portions are straightened.

Fabrication of the support can be provided to control the energy absorption characteristics of the strap. In one construction, the strap is provided with a pair of openings extending therethrough on opposite sides of the central portion to control the energy absorption during the steering column movement. This pair of openings is specifically disclosed as being shaped as elongated slots that extend along the U-shaped portions in a radial direction with respect to the steering axis; however, other shapes, locations and numbers of the openings can also be utilized. In another construction, the strap includes a pair of elongated grooves extending across the strap width and partially through the strap on opposite sides of the central portion to control the energy absorption during the steering column movement. This pair of grooves is specifically disclosed as being located on the strap between the central portion thereof and the pair of U-shaped portions of the strap; however, other shapes, locations and numbers of the grooves can also be utilized.

Best results are achieved when the U-shaped portions each have a cross section including a width that is a plurality of times its thickness and with the mounting portions having the pivotal connections thereof including threaded fasteners that secure the strap to the vehicle.

The objects, features, and advantages of the present invention are readily apparent from the following detailed description of the best modes for carrying out the invention when taken in connection with the accompanying drawings.

BRIEF DESCRIPTION OF DRAWINGS

FIG. 6 is a side view of another embodiment of the support which is taken generally in the same direction as FIGS. 1 and 2 but has U-shaped portions that open in the opposite direction along the steering axis as the U-shaped portions of the other embodiment;

FIG. 7 is a plan view of a further embodiment of the support which includes openings embodied by elongated slots along the U-shaped portions to control the energy absorbed during the stroking movement of the steering column;

FIG. 8 is a plan view of still another embodiment of the support which includes grooves for controlling the energy absorbed during the stroking movement of the steering column;

FIG. 9 is a side view taken along the direction of line 9—9 in FIG. 8 to illustrate the support embodiment thereof; and FIG. 10 is a sectional view taken along the direction of line 10—10 in FIG. 5 to illustrate the construction of the support along the U-shaped portions of each embodiment.

BEST MODE FOR CARRYING OUT THE INVENTION

Figure 1:
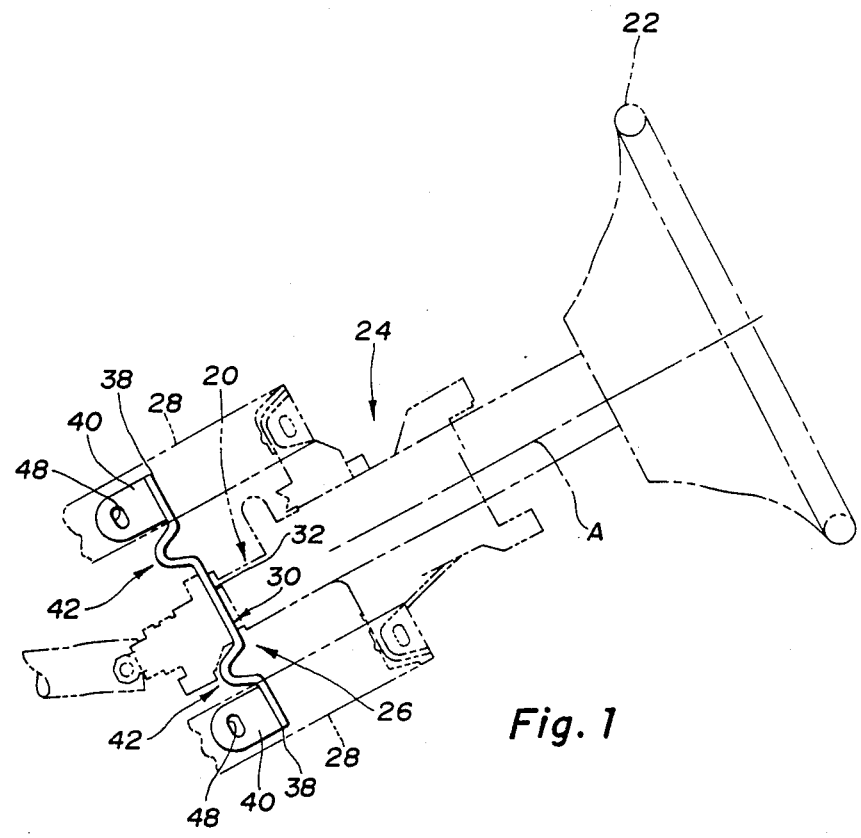
FIG. 1 is an environmental view illustrating the manner in which a support according to the invention is utilized with an energy absorbing steering column to absorb energy during movement of the column along its steering axis.
Figure 2:
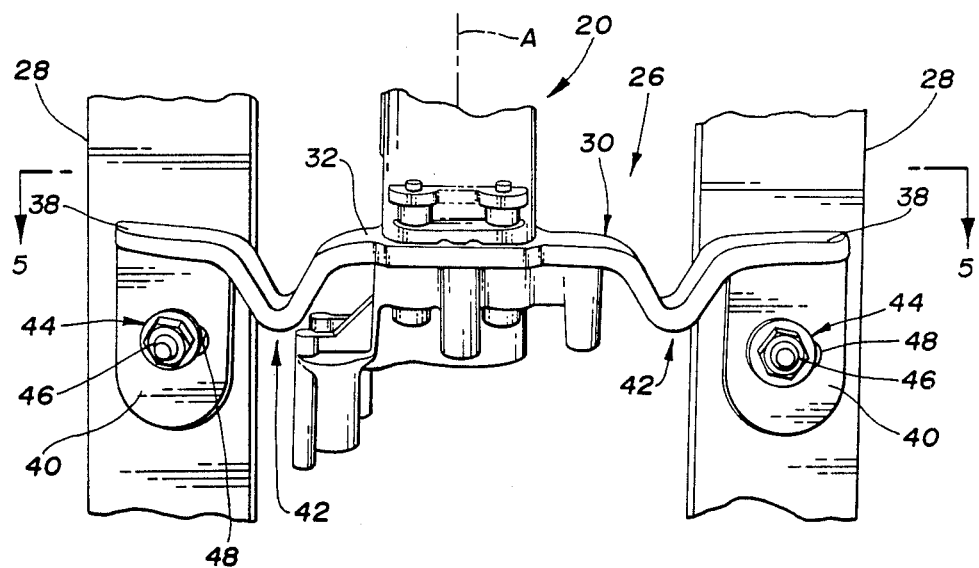
FIG. 2 is an enlarged view of the support and a portion of the energy absorbing steering column before any stroking movement of the column.

As illustrated in FIGS. 1 and 2, an energy absorbing steering column 20 for a vehicle has a steering axis A about which steering takes place during operation of an associated vehicle by manipulation of a steering wheel 22. A shear module 24 is located along the steering axis A adjacent the steering wheel 22 and cooperates with an energy absorbing support 26 to provide mounting thereof on the vehicle such as on the pair of spaced vehicle members 28 illustrated.

Figure 5:
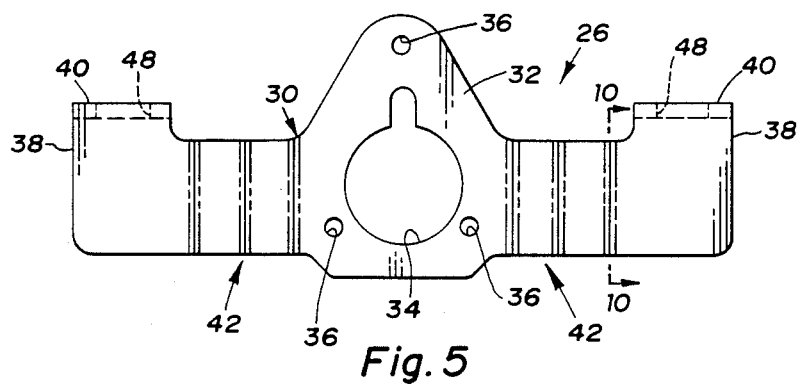
FIG. 5 is an axial view of the support taken along the direction of the steering axis generally along the direction line 5—5 in FIG. 2.

As illustrated by combined reference to FIGS. 2 and 5, the support 26 includes a metal strap 30 that extends transversely with respect to the steering axis A and has a unitary construction. This strap 30 has a central portion 32 against which a portion of the steering column 20 seats with the central steering portion of the steering column extending through a keyhole shaped opening 34. The steering column 20 is secured to the support 26 by unshown fasteners that extend through fastener openings 36 in the central support portion 32 as illustrated in FIG. 5. On opposite sides of this central portion 32, the strap has opposite ends 38 each of which includes a mounting portion 40 for mounting on the vehicle such as to the vehicle members 28 illustrated in FIGS. 1 and 2 in a manner that is hereinafter more fully described. Force applied to the steering wheel 22 such as during a vehicle impact pushes downwardly and forwardly against the support 26 at its central portion 30. This force deforms the supports 26 to absorb energy as is hereinafter described during a stroking movement of the steering column. The construction of the support 26 permits an increased stroke length of movement as compared to prior art steering columns supports of this type.

As best illustrated in FIG. 2, the strap 30 includes a pair of U-shaped portions 42 respectively located between the central portion 32 and the opposite ends 38 thereof with the open end of each U-shaped portion opening in the same direction as each other along the steering axis A. As such, movement of the steering column along the steering axis A deforms the strap as illustrated in FIG. 3 to absorb energy as the U-shaped portions are opened to generally straight shapes extending between the opposite ends of the strap and the central portion thereof that mounts the steering column.

Figure 3:
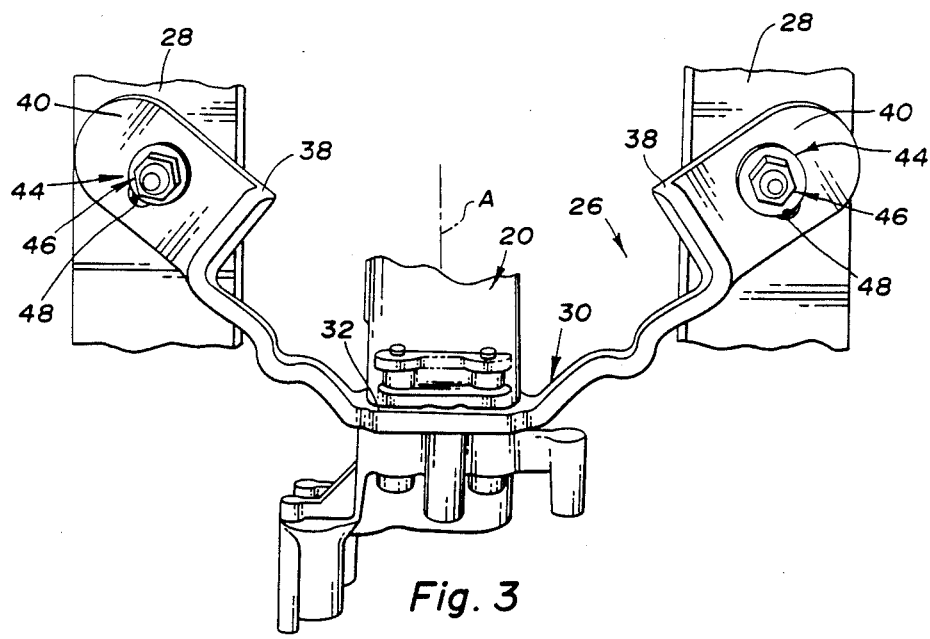
FIG. 3 is a view that illustrates the column after its stroking movement has taken place.

As also illustrated in FIGS. 2 and 3, the opposite ends of the metal strap 30 preferably have clamping connections 44 that mount the mounting portions 40 thereof on opposite sides of the U-shaped portions 42 such that pivoting of the mounting portions against the clamping force cooperates with the straightening of the U-shaped portions to increase the steering column movement that absorbs energy. These clamping connections 44 most preferably include threaded fasteners 46 provided by nut and bolt securement along with an associated washer. More specifically, each mounting portion 40 has a generally flat shape that extends perpendicular to the associated strap end 38 and is disclosed as including an elongated slot 48 through which the associated pivotal connection 34 extends so as to provide clamping of the mounting portion 40 against the associated vehicle member 28.

Figure 4:
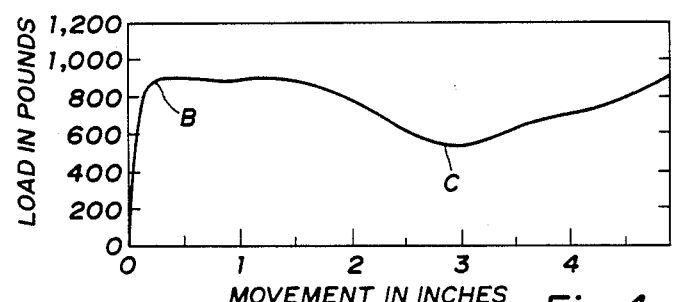
FIG. 4 is a graph that illustrates the load resistance during the stroking movement of the steering column.

Steering column stroking movement from the position of FIG. 2 to the position of FIG. 3 is best understood by reference to the graph of FIG. 4. During the initial column movement prior to reaching point B, the straightening of the U-shaped portions 42 provides the only energy absorption. Thereafter, the U-shaped portions 42 continue to straighten and the clamping connections 44 begin to pivot as rotational slippage of the clamping connection takes place between the mounting portions 40 and the supports 28, and such combined energy absorption continues until reaching point C. Thereafter, continued straightening of the U-shaped portions 42 and stretching of the metal strap provides continued energy absorption which increases as the stroke continues.

As illustrated in FIGS. 1 and 2, the U-shaped portions 42 open in the opposite direction along the steering axis A to the direction of the steering column movement during the energy absorption as the U-shaped portions are straightened.

In another embodiment illustrated in FIG. 6, the support 26' has a metal strap 30' that is the same as the previously described embodiment except for the fact that its U-shaped portions 42' open in the same direction along the steering axis A as the direction of steering column movement during the energy absorption as the U-shaped portions are straightened. Thus, these U-shaped portions 42' of the FIG. 6 embodiment open in the opposite direction as the U-shaped portions 42 of the embodiment illustrated in FIGS. 1, 2 and 5.

In another embodiment illustrated in FIG. 7, the support 26a is constructed like either of the other two previously described embodiments with its U-shaped portions 42a opening either in the direction opposite to the direction of steering column movement during energy absorption as with the embodiment of FIGS. 1, 2 and 5 or opening in the same direction as the direction of steering column movement during energy absorption as with the embodiment of FIG. 6. This embodiment 26a of the support has its metal strap 30a provided with a pair of openings 50 extending therethrough on opposite sides of the central portion 32. Provision of these openings 50 controls the energy absorption during the steering column movement by weakening the strap. As illustrated, the pair of openings 50 are shaped as elongated slots extend along the U-shaped portions 42a in a radial direction with respect to the steering axis A. It should also be appreciated that more than one opening 50 can be provided on each side of the steering axis A and that the openings may have different configurations and orientations than the radially extending slots illustrated depending upon the desired deformation characteristics.

As illustrated in FIGS. 8 and 9, a further embodiment of the support 26b has its metal strap 30b provided with a pair of elongated grooves 52 extending across the width of the strap and partially through the strap on opposite sides of the central portion 30 to control energy absorption during the steering column movement. As illustrated, these grooves 52 extend perpendicular to a straight line between the ends of the strap and are located on the strap between the central portion thereof and the pair of U-shaped portions 42b of the strap. These U-shaped portions 42b are illustrated as opening in the opposite direction to the direction of steering column movement as with the embodiment of FIGS. 1 through 5. However, it should be appreciated that the grooves can also be used with an embodiment as in FIG. 6 whose U-shaped portions 42b can also open in the same direction as the direction of steering column movement during energy absorption.

Other than the differences mentioned, the embodiments of FIGS. 6, 7, and 8, 9 have the same construction as the embodiments of FIGS. 1 through 5 such that like reference numerals are applied to like portions thereof and the prior description is applicable such that it need not be repeated.

As illustrated in FIG. 10, the U-shaped portions of each embodiment of the strap have a cross section including a thickness x and a width y that is a plurality of times the thickness x. Best results are achieved when the width y is at least several times the thickness x.

While the best modes for carrying out the invention have been described in detail, those familiar with the art to which this invention relates will recognize various alternative designs and embodiments for practicing the invention as defined by the following claims.

What is claimed is:

1. For use with a vehicle energy absorbing steering column having a steering axis about which steering takes place during operation of the vehicle, a support for mounting the steering column on the vehicle comprising: a metal strap that extends transversely with respect to the steering axis and has a central portion that mounts the steering column on the strap; the strap having opposite ends each of which includes a mounting portion for mounting on the vehicle; and the strap including a pair of U-shaped portions respectively located between the central portion and the opposite ends thereof with the open end of each U-shaped portion opening in the same direction as the other along the steering axis whereby movement of the steering column along the steering axis deforms the strap to absorb energy as the U-shaped portions are opened to generally straight shapes extending between the opposite ends of the strap and the central portion thereof that mounts the steering column.

2. A steering column support as in claim 1 wherein the opposite ends of the metal strap have clamping connections that mount the mounting portions thereof on opposite sides of the U-shaped portions such that pivoting of the mounting portions cooperates with the straightening of the U-shaped portions to increase the steering column movement that absorbs energy.

3. a steering column as in claim 1 wherein the U-shaped portions open in the opposite direction along the steering axis to the direction of steering column movement during the energy absorption as the U-shaped portions are straightened.

4. A steering column support as in claim 1 wherein the U-shaped portions open in the same direction along the steering axis as the direction of steering column movement during the energy absorption as the U-shaped portions are straightened.

5. A steering column support as in claim 1 wherein the strap includes a pair of openings extending therethrough on opposite sides of the central portion to control the energy absorption during the steering column movement.

6. A steering column support as in claim 5 wherein the pair of openings are shaped as elongated slots that extend along the U-shaped portions in a radial direction with respect to the steering axis.

7. A steering column support as in claim 1 wherein the strap includes a pair of elongated grooves extending partially through the strap on opposite sides of the central portion to control the energy absorption during the steering column movement.

8. A steering column support as in claim 7 wherein the pair of grooves are located on the strap between the central portion thereof and the pair of U-shaped portions of the strap.

9. In an energy absorbing steering column for use with a vehicle and having a steering axis about which steering takes place during operation of the vehicle, a support for mounting the steering column on the vehicle comprising: a metal strap that extends transversely with respect to the steering axis and has a central portion that mounts the steering column on the strap; the strap having opposite ends each of which includes a mounting portion for mounting on the vehicle; the strap including a pair of U-shaped portions respectively located between the central portion and the opposite ends thereof with the open end of each U-shaped portion opening in the same direction as the other along the steering axis whereby movement of the steering column along the steering axis deforms the strap to absorb energy as the U-shaped portions are opened to a generally straight shapes extending between the opposite ends of the strap and the central portion thereof that mounts the steering column; and clamping connections that mount the mounting portions of the strap on opposite sides of the U-shaped portions such that pivoting of the mounting portions cooperates with the straightening of the U-shaped portions to increase the steering column movement that absorbs energy.

10. In an energy absorbing steering column for use with a vehicle and having a steering axis about which steering takes place during operation of the vehicle, a support for mounting the steering column on the vehicle comprising: a metal strap that extends transversely with respect to the steering axis and has a central portion that mounts the steering column on the strap; the strap having opposite ends each of which includes a mounting portion for mounting on the vehicle; the strap including a pair of U-shaped portions respectively located between the central portion and the opposite ends thereof with the open end of each U-shaped portion opening in the same direction as the other along the steering axis whereby movement of the steering column along the steering axis deforms the strap to absorb energy as the U-shaped portions are opened to generally straight shapes extending between the opposite ends of the strap and the central portion thereof that mounts the steering column; the U-shaped portions each having a cross section including a thickness x and also having width y that is a plurality of times the thickness x; and clamping connections including threaded fasteners that mount the mounting portions of the strap on opposite sides of the U-shaped portions such that pivoting of the mounting portions cooperates with the straightening of the U-shaped portions to increase the steering column movement that absorbs energy.

* * * * *